United States Patent [19]

Musa

[11] Patent Number: 5,130,930
[45] Date of Patent: Jul. 14, 1992

[54] DIAGNOSTIC DEVICE FOR VEHICLE ENGINE ANALYSIS

[75] Inventor: Ikuo Musa, Himeji, Japan

[73] Assignee: Mitsubishi Denki Kabushiki Kaisha, Tokyo, Japan

[21] Appl. No.: 565,094

[22] Filed: Aug. 10, 1990

Related U.S. Application Data

[63] Continuation-in-part of Ser. No. 421,023, Oct. 13, 1989, abandoned.

[30] Foreign Application Priority Data

Oct. 14, 1988 [JP] Japan ................. 63-259721

[51] Int. Cl.$^5$ .............................. G06F 15/20
[52] U.S. Cl. .................. 364/431.05; 364/424.03; 73/117.3
[58] Field of Search ........ 364/424.03, 424.04, 364/550, 551.01, 431.01, 431.09; 123/339, 481, 198 DB, 198 F; 73/116, 117.3, 118.1, 119 A

[56] References Cited

U.S. PATENT DOCUMENTS

| | | | |
|---|---|---|---|
| 4,094,274 | 6/1978 | Harada et al. | 364/431.09 |
| 4,338,896 | 7/1982 | Papasideris | 123/198 DB |
| 4,534,214 | 8/1985 | Takahashi | 73/117.3 |
| 4,788,858 | 12/1988 | Liebermann | 73/119 A |
| 4,839,811 | 6/1989 | Kanegae et al. | 364/424.03 |
| 4,906,970 | 3/1990 | Momura | 364/424.03 |
| 4,943,924 | 7/1990 | Kanegae et al. | 364/431.09 |
| 4,975,847 | 12/1990 | Abe et al. | 364/424.03 |

FOREIGN PATENT DOCUMENTS 135252 3/1989 Japan.
243832 6/1989 Japan.
135437 10/1989 Japan.

*Primary Examiner*—Thomas G. Black
*Attorney, Agent, or Firm*—Sughrue, Mion, Zinn, Macpeak and Seas

[57] ABSTRACT

A vehicle engine diagnostic device equipped with a forcible load-controller for forcibly changing, during operation, the drive conditions of a desired one of a plurality of driven loads, such as fuel injectors. If that driven load is functioning normally, changing its drive conditions by the forcible load-controller causes the operating conditions of the associated control unit, i.e., of the main control section, to change accordingly; if that driven load or any of its associated devices are out of order, no change occurs in the operating conditions of the control unit. Thus, the diagnostic device makes it possible to diagnose even driven loads which are not equipped with sensors as well as the devices associated therewith.

4 Claims, 3 Drawing Sheets

DIAGNOSTIC DEVICE FOR VEHICLE ENGINE ANALYSIS

This is a continuation-in-part of application Ser. No. 07/421,023, filed Oct. 13, 1989 and now abandoned.

BACKGROUND OF THE INVENTION

1. Field of the Invention

This invention relates to a diagnostic device used in an electronic control unit adapted to control a plurality of driven loads in accordance with input signals from a plurality of sensors, particularly applicable to engine analysis in an automotive vehicle.

2. Description of the Related Art

In conventional diagnostic devices of this type, which are used in electronic vehicle-control units, diagnosis is effected, either while the vehicle is running or at rest, by detecting abnormal outputs due to short-circuiting or disconnection of various sensors mounted on the vehicle. An example of such an electronic control unit, mounted on a vehicle and equipped with a diagnostic function is disclosed in U.S. Patent Ser. No. 160,837 now U.S. Pat. No. 4,924,391, which corresponds, for example, to Japanese Utility Model Laid-Opens No. 63-135437 and 63-135252, and to Japanese Patent Laid-Open No. 63-243832.

The problem with such conventional diagnostic devices is that they can only diagnose trouble with sensors: they cannot detect trouble in loads which are not equipped with sensors.

SUMMARY OF THE INVENTION

This invention has been contrived with a view to eliminating the above problem. It is accordingly an object of this invention to provide a diagnostic device which is capable of detecting with ease any trouble not only in the sensors but also in the driven loads which are not equipped with sensors.

The diagnostic device of this invention is equipped with a forcible load-control means for forcibly changing the drive condition of one of a plurality of driven loads during operation. If, as a result of thus changing the driven condition of one drive load, the operating conditions of the electronic control unit change, that driven load and the associated devices (including those not equipped with sensors) are judged to be in the normal condition: if there is no change in the operating conditions of the electronic control unit, that driven load or the associated devices are judged to be out of order.

Thus, in accordance with this invention, there is provided a diagnostic device comprising: a plurality of driven loads incorporated into an operation-control system; a sensor means including a plurality of sensors for detecting the values of various factors related to the control of the plurality of driven loads; a forcible load-control means for forcibly changing the driven conditions of the drive loads; and a main control means adapted to control the respective operating conditions of the plurality of driven loads in accordance with the information provided by the sensor means, and to set a desired one of the plurality of driven loads in a desired drive condition in response to the operation of the forcible load-control means, monitoring the resulting changes in its own operating conditions. Any trouble in the driven loads and devices associated therewith is detected by forcibly changing the driven conditions of one of the drive loads and checking to see if any change occurs in the drive conditions of the main control means as a result of this forced change.

DETAILED DESCRIPTION OF THE PREFERRED EMBODIMENTS

An embodiment of this invention will now be described with reference to the accompanying drawings.

Figure 1:
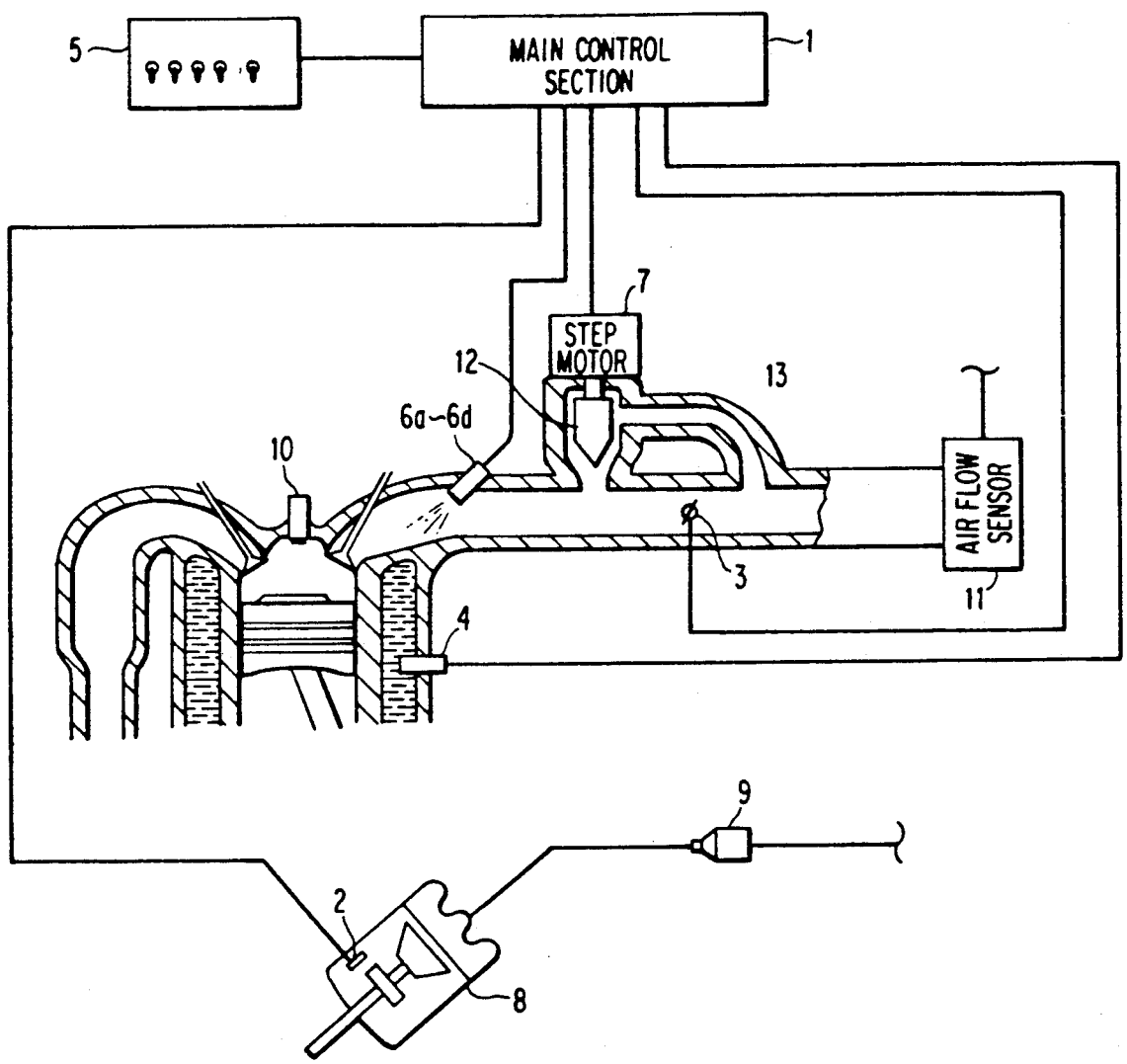
FIG. 1 is a schematic block diagram showing the construction of an electronic engine-control unit for an automobile engine including a diagnostic device in accordance with this invention.

FIG. 1 shows the construction of an automotive engine control system in accordance with the present invention. The control system includes a main control section 1 which receives various engine operating parameters and performs various determinations and computations in accordance with the received parameters so as to control the fuel injection rate and the position of an air bypass valve 12 in an air bypass passage 13, an engine speed sensor 2 for sensing the speed of the engine, a throttle-opening sensor 3 for sensing the degree of opening of a throttle valve, a temperature sensor 4 for sensing the temperature of engine cooling water, a forcible load-control switch 5, four injectors 6a to 6d, and a stepping motor 7 for driving the air bypass valve 12. Further, 8 denotes a distributor, 9 an ignition coil, 10 spark plugs and 11 an air flow sensor.

In operation, upon receipt of outputs from the sensors 2 to 4, the main control section 1 controls and drives the injectors 6a to 6d, the stepping motor 7 and other drive loads such as solenoids, spark plugs 10, lamps and so forth. The forcible load-control switch 5 transmits the operating states of its switches 5a, 5b, 5c, and 5d (FIG. 2) in the form of a serial signal to the main control section 1, and conducts a forcible control of the driven loads, e.g., stop of operation, continuous operation, operation for a predetermined period, operation in a predetermined amount, and so forth.

Figure 2:
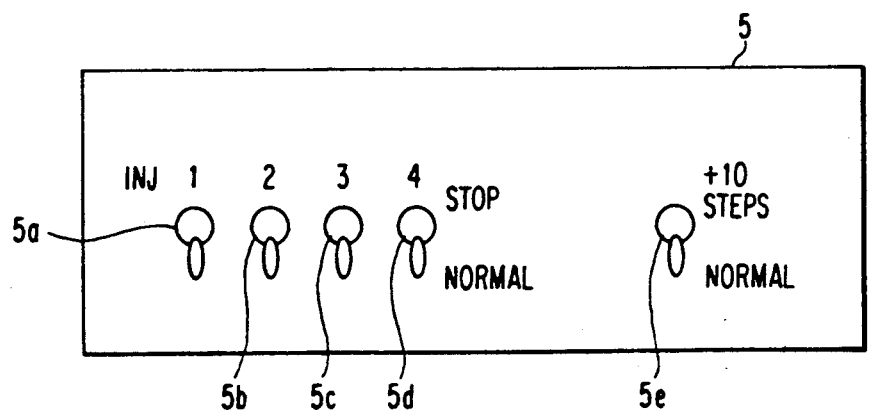
FIG. 2 is a schematic view illustrating the configuration of the forcible load-control switch used in the diagnostic device of FIG. 1.

FIG. 2 shows the configuration of the forcible load-control switch 5, which includes change-over switches 5a to 5d for switching between the normal operating condition and the operation-stop condition for each of the injectors 6a to 6d as well as a change-over switch 5e for switching between the normal operation and a +10-step condition (a condition in which a 10-step advancement is made) of the stepping motor 7.

Figure 3:
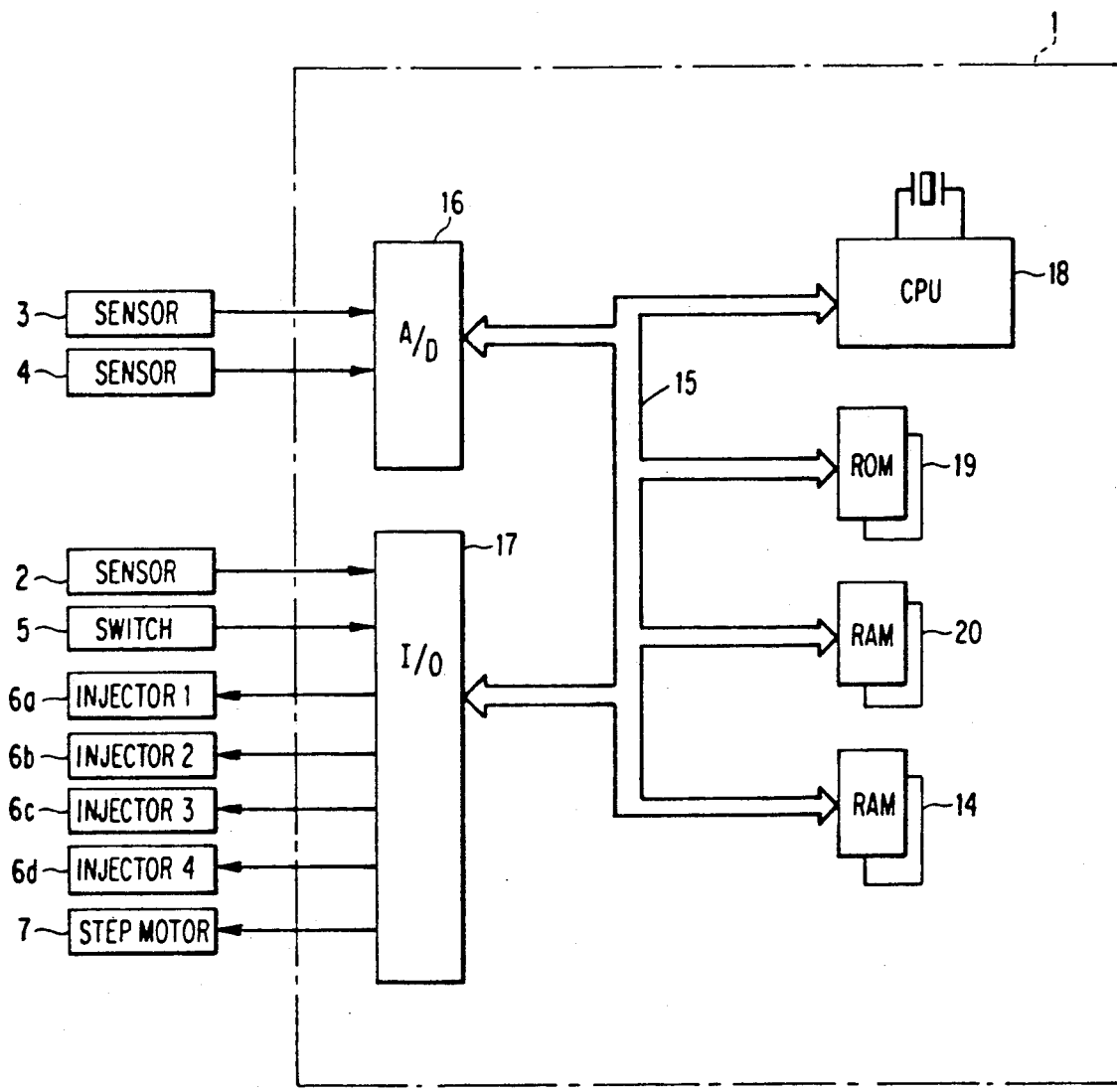
FIG. 3 is a block diagram showing the internal structure of the main control section of FIG. 1.

FIG. 3 shows the internal structure of the main control section 1 shown in FIG. 1. The main control section 1 includes a CPU 18 for executing a program for the flowchart shown in FIG. 4, a ROM 19 for storing the program, a non-volatile RAM 20 which serves as a work memory for storing calculated values and data, a RAM 14 which serves as a work memory, an A/D converter 16 for converting analog signals to digital signals, an input/output circuit 17 for inputting digital signals and for outputting signals such as a signal representing the computed fuel injection rate, a drive signal for the stepping motor, and the like, and a common BUS 15 through which the above-mentioned components are connected.

In operation, when the main control section 1 is being supplied with electrical power from a power supply, the CPU 18 executes a main routine (not shown) cyclically at a predetermined time interval, so as to compute the fuel injection rate in accordance with data input from the throttle-opening sensor 3, the temperature sensor 4 and the engine speed sensor 2. Upon receipt of a signal from the throttle-opening sensor 3 indicative of no depression of an accelerator pedal, the CPU determines that the engine is in an idling state and controls the flow rate of air flowing through the air bypass passage by opening and closing the air bypass valve 12 under the action of the stepping motor 7, so as to set the engine speed to a predetermined command speed which may be a function of, inter alia, the output from the temperature sensor 3.

Figure 4:
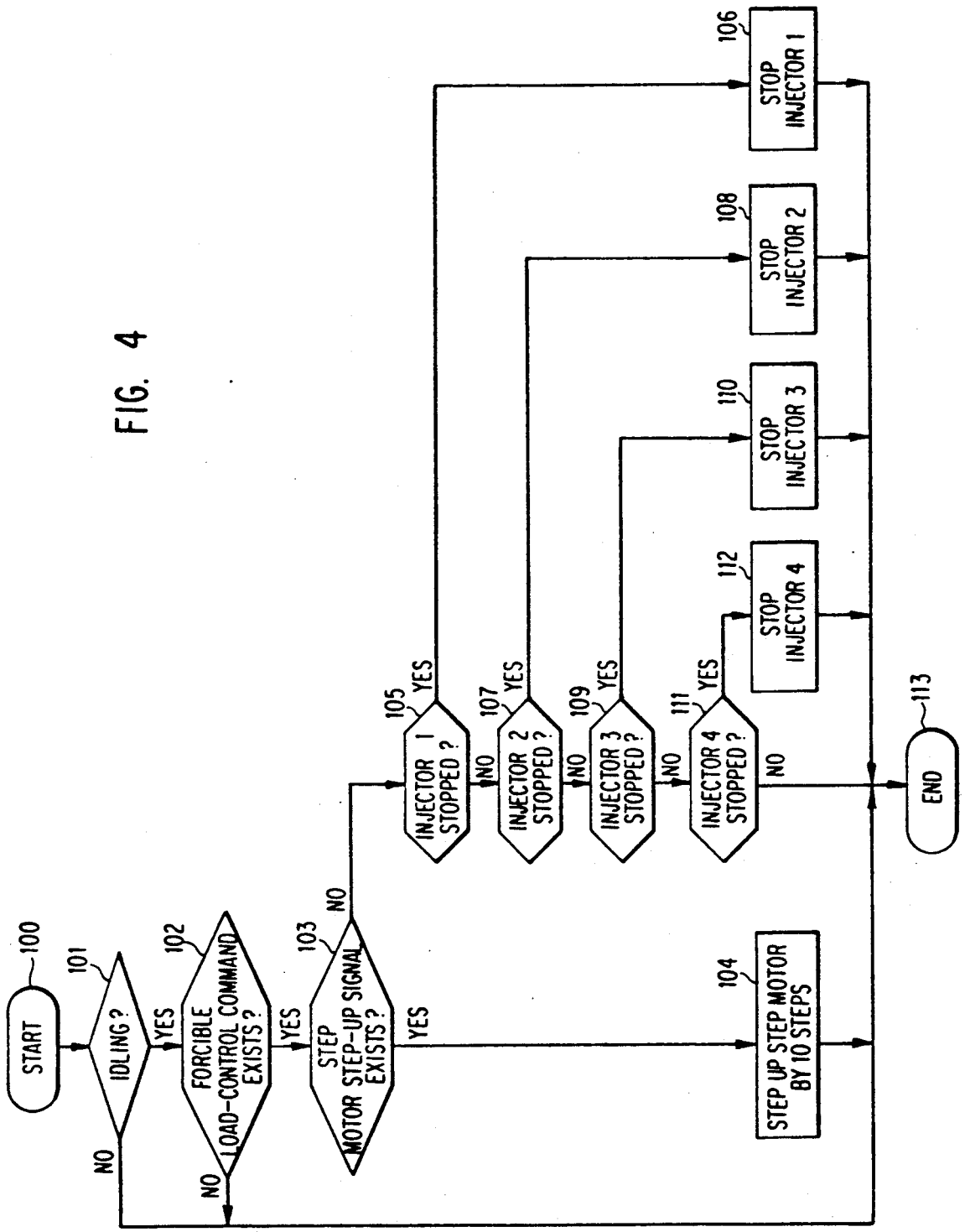
FIG. 4 is a flowchart of a diagnostic processing routine stored in and executed by the main control section.

Meanwhile, a processing routine as shown in FIG. 4 is executed at a rate of, for example, once per cycle of the execution of the main routine. The processing routine starts in Step 100. In Step 101, it is determined whether the engine is in an idling state. If the engine is not idling, the process proceeds to Step 113 where this processing routine is finished. Conversely, when the engine is idling, the process proceeds to Step 102 where it is determined whether a forcible load-control command has been received by the main control section 1 by operating the forcible load-control switch 5. If no forcible load command has been received by the main control section 1, the process proceeds to Step 113, completing this routine.

However, when a forcible load-control command has been received, the process proceeds to Step 103 in which it is determined whether the received forcible load-control command is a step-up signal for the motor 7. If this command is a step-up command, the process proceeds to Step 104 in which the stepping motor 7 is stepped up by +10 steps from its present position. If the motor 7 and the air bypass valve 12 are operating correctly, the flow rate of air in the bypass passage 13 is increased to raise the engine speed. However, if the motor 7 and/or the air bypass valve 12 has failed, or if the motor 7 has become disconnected from the main control section 1, the flow rate of the air flowing through the air bypass passage 13 is not changed, and neither is the engine speed as may easily be discerned by the operator. After the execution of Step 104, the process proceeds to Step 113, completing this process.

If it is determined in Step 103 that the forcible load-control command is not a step-up command, the process proceeds to Step 105 in which it is determined whether the forcible load-control command is a stop command for the injector #1 (6a). If the command is a stop command for stopping the injector #1 (6a), the process proceeds to Step 106 in which the injector #1 (6a) is stopped. Then, the process proceeds to Step 113 for the completion of the process. In Step 106, if injector #1 (6a) is in a normal condition and functioning properly, the engine power is decreased when the supply of fuel to the cylinder #1 is stopped. Consequently, the engine speed fluctuates, thus producing a rough-idle condition. On the other hand, if the injector #1 (6a) is malfunctioning or has become disconnected from the control section 1, the engine output and, hence, the engine speed do not change despite the execution of Step 106.

In Step 105, if the command given is not the command for stopping the injector #1 (6a), the process proceeds to Step 107 in which it is determined whether the forcible load-control command is a command for stopping the injector #2 (6b). If the answer is YES, the injector #2 (6b) is stopped as described above. Similarly, in Steps 109 and 111, it is respectively determined whether the forcible load-control commands are to stop the injectors #3 (6c) and #4 (6d), respectively. If the answers are YES, Steps 110 and 112 are executed to stop the injectors #3 (6c) and #4 (6d) respectively, and the process proceeds to Step 113. completing the process.

If the forcible load-control command in Step 111 is not for stopping the injector #4 (6d), the process proceeds to Step 113.

In some cases a spark plug can be out of order while its associated injector is normal. In any event, any trouble in either the injectors 6a to 6d or in their associated devices can be detected easily and quickly.

In the described embodiment, the CPU 18 conducts the main routine at a predetermined time interval. This, however, is not exclusive and the main routine may be repeated continuously or may be conducted for each predetermined number of revolutions of the engine crank shaft. The interrupt routine shown in FIG. 4 also may be conducted for each predetermined time interval or at a predetermined number of rotations of the engine crank shaft, independently of the main routine.

In the flowchart shown in FIG. 4, the forcible load-control is conducted only when the engine is idling. This, however, is only illustrative and the forcible load-control may be conducted during loaded running of the engine. Thus, Step 101 may be omitted.

Although in the described embodiment the forcible control of the stepping motor 7 is performed by stepping up the motor by a predetermined number of steps, this control may be conducted by driving the motor 7 to a predetermined rotational condition regardless of its previous condition.

In the described embodiment, the control of the air flow rate in the air bypass passage 13 is forcibly changed by controlling the stepping motor 7. This, however, is only illustrative and the arrangement may be such that a duty solenoid or a linear solenoid is provided in the air bypass passage 13 instead of the motor 7 to control the air flow rate in the bypass passage 13. In such a case, the duty factor of the duty solenoid or the linear solenoid is forcibly controlled to be, for example, +10% to change the flow rate of the air in the bypass passage, thereby attaining the same effect.

Further, although in the described embodiment the operating states of the switches 5a to 5e of the forcible load-control switch means 5 are transmitted in the form of a serial signal to the control section 1, this is also only illustrative and the operating states of these switches 5a to 5e may instead be transmitted in the form of a parallel signal, It is also possible to output the operating states of these switches in the form of analog signals although digital signals are used for this purpose in the described embodiment.

While the above-described embodiment is shown as applied to an engine-control unit; this invention should not be construed as restricted to this application. It can also be applied to other types of control units.

Thus, in accordance with this invention, a forcible load-control means is used to forcibly change the drive condition of a desired one of the driven loads during operation. If that driven load is in a normal, properly functioning condition, changing the drive condition of this load by the forcible load-control means will result in the operating condition of the control unit also changing. If that driven load or the associated devices are out of order, the operating condition of the control unit will not change. Thus, the diagnostic device of this invention makes it possible to easily and quickly diagnose even driven loads which are not equipped with sensors as well as the devices associated therewith.

I claim:

1. A vehicle engine diagnostic device, comprising:

a plurality of driven loads including fuel injectors, said driven loads having associated normal operating conditions;

sensor means including an engine speed sensor, a throttle opening sensor and a cooling water temperature sensor;

forcible load-control means for selectively, individually and forcibly changing said normal operating conditions of said driven loads; and main control means for controlling respective operating conditions of said driven loads in accordance with information provided by said sensor means, for setting a selected one of said driven loads in a desired operating condition in response to the operation of said forcible load-control means, and for monitoring resulting changes in operating conditions of the engine; wherein;

a) malfunctions in said driven loads and associated engine components may be detected by selectively and individually changing the normal operating conditions of said loads and monitoring the engine operating conditions to determine if any attendant changes result, b) said forcible load-control means forcibly controls said driven loads to interrupt their operation, to continuously operate them, to operate them for a predetermined period, or to move them for a predetermined distance, c) said main control means constitutes a control section of a vehicle-engine control unit;

d) said plurality of driven loads further includes a stepping motor for controlling a valve in an intake air bypass passage of the engine; and e) said forcible load-control means includes change-over switches corresponding to said driven loads, said change-over switches being selectively operable to individually disable said plurality of injectors and to forcibly advance said stepping motor in a direction to further open said valve.

2. A diagnostic device as claimed in claim 1, wherein said driven loads further include solenoids and ignition plugs.

3. A diagnostic device as claimed in claim 1, wherein when one of said injectors is disabled by manipulating an associated change-over switch, the main control means monitors a resulting change in the engine speed from an output of said engine speed sensor.

4. A diagnostic device as claimed in claim 1, wherein when said stepping motor is advanced, said main control means monitors a resulting change in the engine speed from an output of said engine speed sensor.

* * * * *